(12) United States Patent
Sakurai et al.

(10) Patent No.: US 9,342,203 B2
(45) Date of Patent: May 17, 2016

(54) INPUT APPARATUS AND INPUT METHOD

(75) Inventors: Satoshi Sakurai, Tokyo (JP); Takashi Nakajima, Tokyo (JP); Norio Endo, Tokyo (JP)

(73) Assignee: FUJITSU COMPONENT LIMITED, Tokyo (JP)

(*) Notice: Subject to any disclaimer, the term of this patent is extended or adjusted under 35 U.S.C. 154(b) by 1080 days.

(21) Appl. No.: 13/305,920

(22) Filed: Nov. 29, 2011

(65) Prior Publication Data
US 2012/0158332 A1 Jun. 21, 2012

(30) Foreign Application Priority Data
Dec. 15, 2010 (JP) ................. 2010-279715

(51) Int. Cl.
| | | |
|---|---|---|
| *G01R 1/40* | (2006.01) | |
| *G01R 1/06* | (2006.01) | |
| *G01R 1/067* | (2006.01) | |
| *G01R 1/07* | (2006.01) | |
| *G06F 3/045* | (2006.01) | |
| *G06F 3/041* | (2006.01) | |

(52) U.S. Cl.
CPC .............. *G06F 3/045* (2013.01); *G06F 3/0416* (2013.01)

(58) Field of Classification Search
CPC ........................................................ G06F 3/00
USPC ................... 702/59, 60, 62, 65, 179; 345/173
See application file for complete search history.

(56) References Cited

U.S. PATENT DOCUMENTS

| | | | | |
|---|---|---|---|---|
| 7,825,911 | B2 * | 11/2010 | Sano et al. ................... 345/173 |
| 8,466,886 | B2 * | 6/2013 | Mizuhashi et al. ........... 345/173 |
| 8,766,925 | B2 * | 7/2014 | Perlin et al. .................. 345/173 |
| 2003/0021896 | A1 * | 1/2003 | Kondo et al. ............. 427/255.28 |
| 2004/0100608 | A1 * | 5/2004 | Matsueda et al. ............. 349/149 |

FOREIGN PATENT DOCUMENTS

| | | |
|---|---|---|
| CN | 1828990 | 9/2006 |
| JP | 6-309087 | 11/1994 |
| JP | 9-081301 | 3/1997 |
| JP | 2000-056914 | 2/2000 |
| JP | 2005-275632 | 10/2005 |
| JP | 2006-106841 | 4/2006 |
| KR | 10-2004-0002310 | 1/2004 |

\* cited by examiner

*Primary Examiner* — Gregory J Toatley
*Assistant Examiner* — Felix Suarez
(74) *Attorney, Agent, or Firm* — IPUSA, PLLC

(57) ABSTRACT

A disclosed input apparatus includes an operating part pressed by a user; a first resistance film and a second resistance film facing each other; a measuring unit configured to measure a difference between a first electric potential of a first end of a contact resistance and a second electric potential of a second end of the contact resistance; and a detecting unit configured to obtain pressure information indicative of a pressure load caused by the pressing of the operating part based on the difference in electric potential.

17 Claims, 13 Drawing Sheets

(A)

(B)

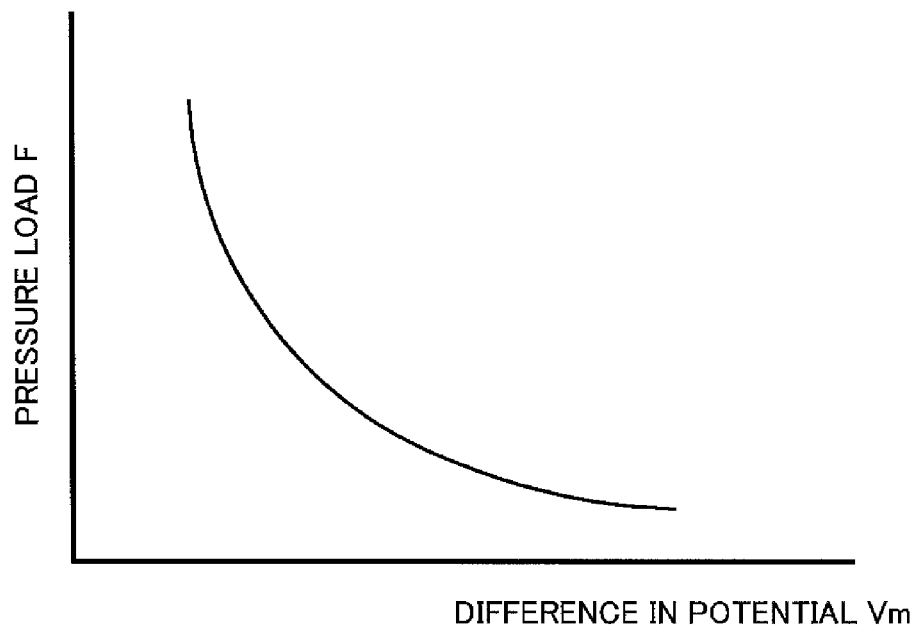

FIG.13

| USER | THRESHOLD VALUE |
|---|---|
| X | $\alpha_1$ |
| Y | $\alpha_2$ |
| Z | $\alpha_3$ |
| ⋮ | ⋮ |

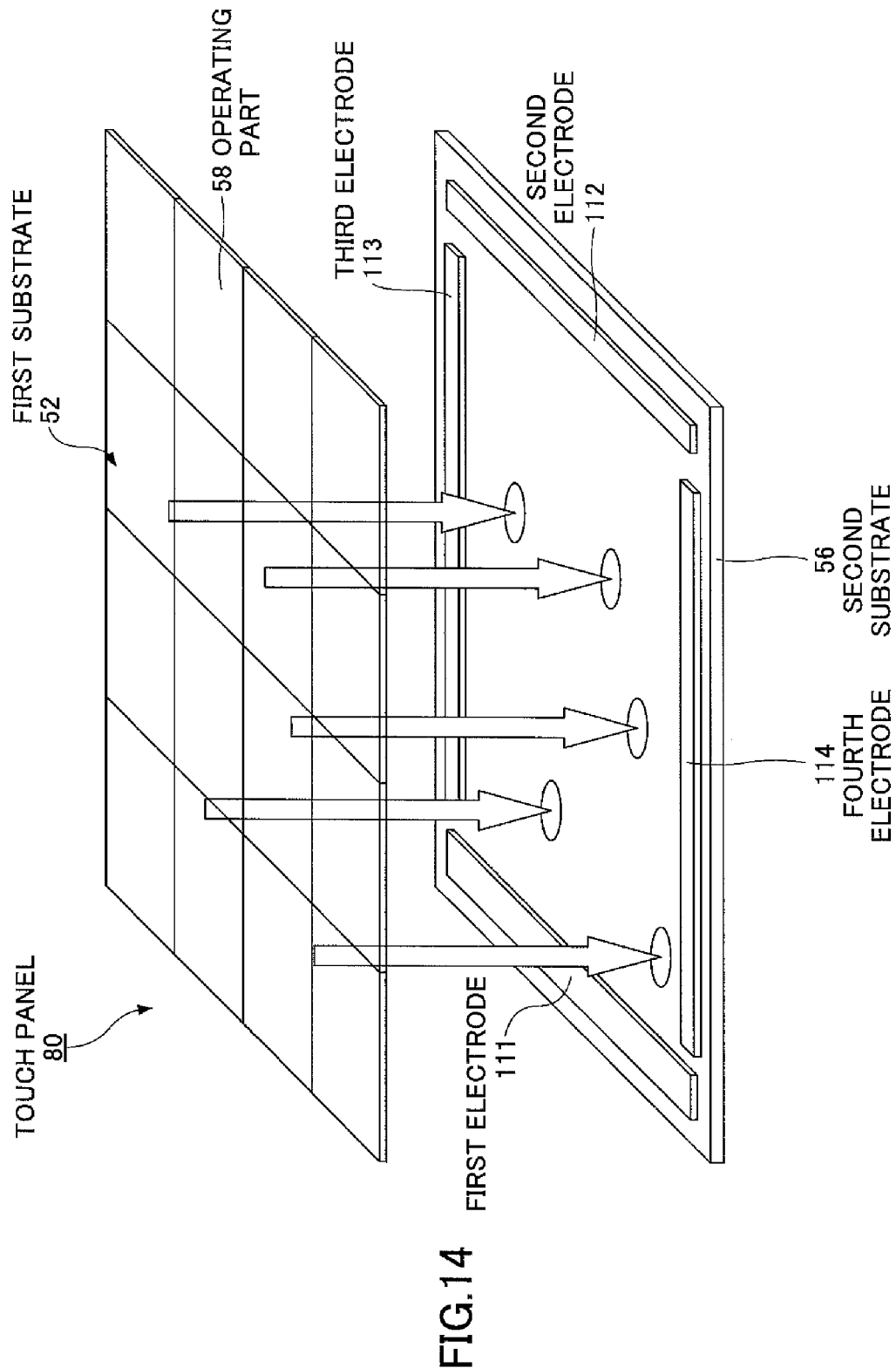

INPUT APPARATUS AND INPUT METHOD

CROSS-REFERENCE TO RELATED APPLICATIONS

This patent application is based upon and claims the benefit of priority of the prior Japanese Patent Application No. 2010-279715 filed on Dec. 15, 2010 the entire contents of which are incorporated herein by reference.

FIELD

The embodiments discussed herein relates to an input apparatus and an input method.

BACKGROUND

Various input apparatuses such as a touch panel have been known to exist. According to a technique disclosed in Japanese Unexamined Patent Application Publication No. 2006-106841, a touch panel having a function of preventing an erroneous touching operation (touching a wrong place) is provided.

SUMMARY

However, the touch panel of Patent Document 1 has a problem that a production cost and an apparatus scale become great.

According to an aspect of the embodiment, an input apparatus includes an operating part pressed by a user; a first resistance film and a second resistance film facing each other; a measuring unit configured to measure a difference in electric potential between a first electric potential of a first end of a contact resistance and a second electric potential of a second end of the contact resistance; and a detecting unit configured to obtain pressure information indicative of a pressure load caused by the pressing of the operating part based on the difference in electric potential.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 7 illustrates a relationship between a pressure load and a difference in an electric potential;

FIG. 8 is a table in which the pressure load and the difference in the electric potential are associated;

FIG. 13 is a table in which users and the threshold values are associated; and

FIG. 14 is an exploded perspective view of the touch panel enabling plural inputs.

DESCRIPTION OF EMBODIMENTS

A description is given below, with reference to FIG. 1 through FIG. 14 of the embodiments of the present invention. The same reference symbols are attached to elements having the same functions and steps carrying out the same processes, and descriptions of these overlapping portions are omitted.

[a] First Embodiment

Figure 1:
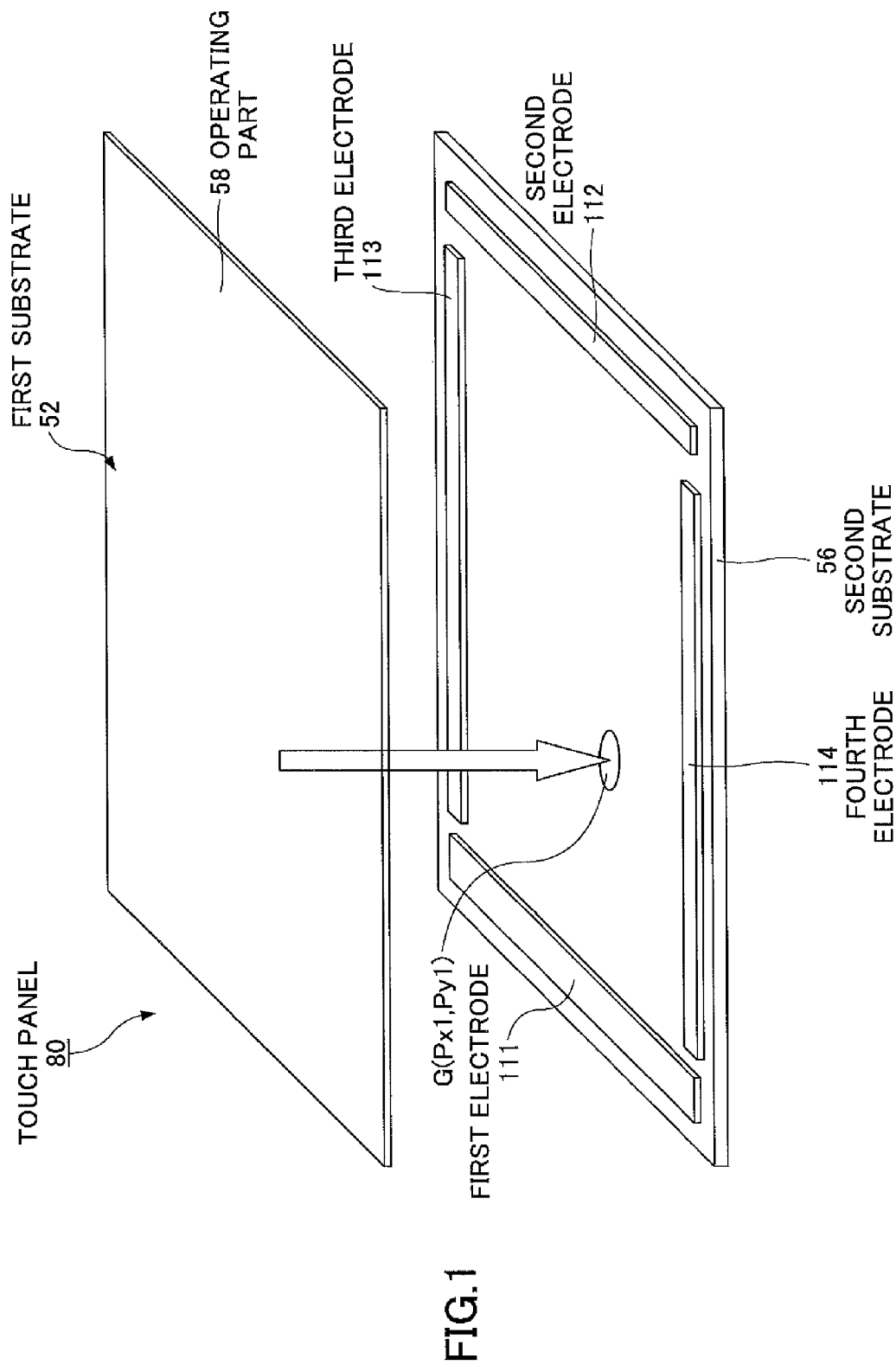
FIG. 1 is an exploded perspective view of a touch panel of an embodiment.
Figure 2:
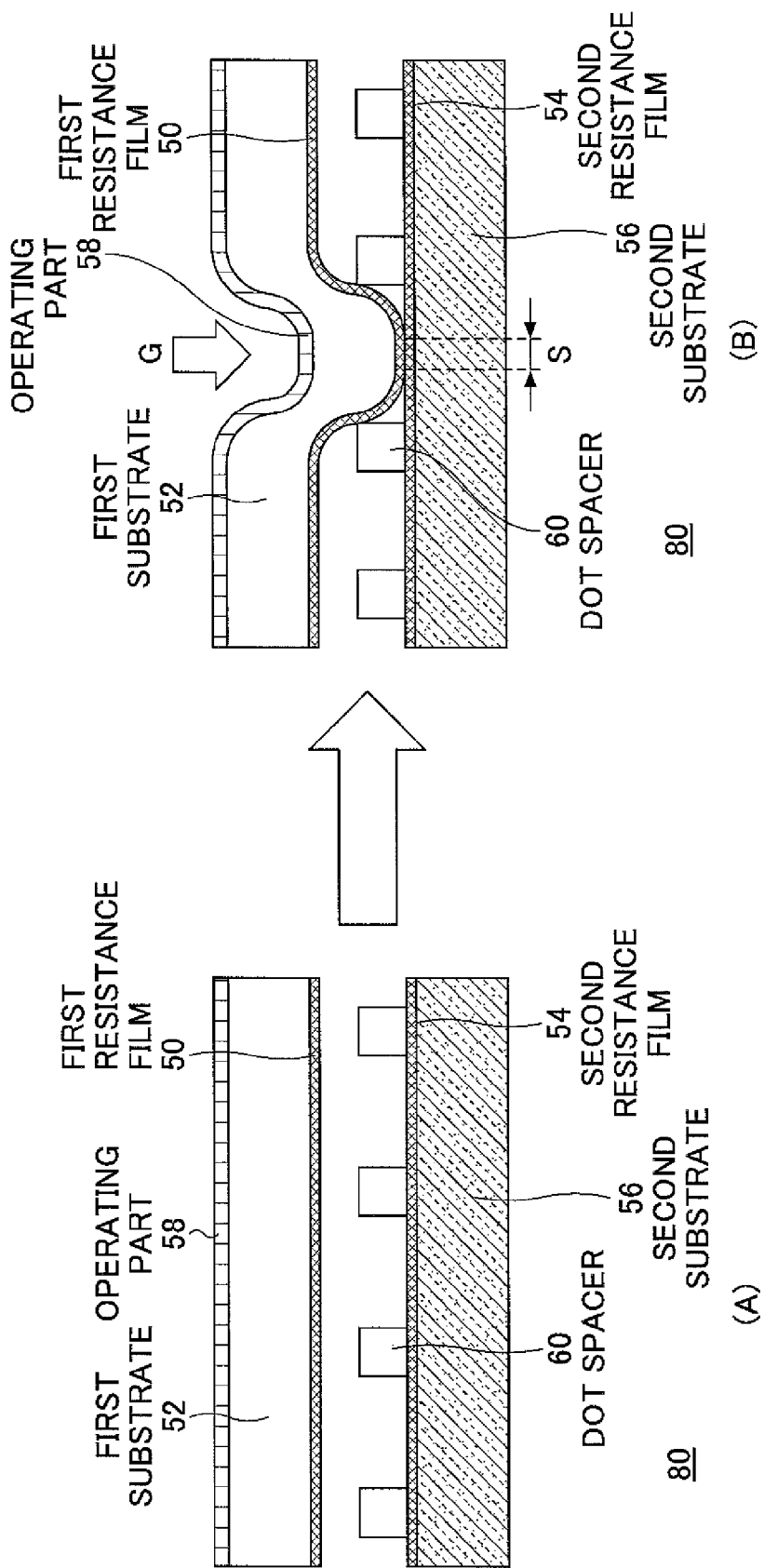
FIG. 2 is a cross-sectional view of the touch panel of the embodiment.
Figure 3:
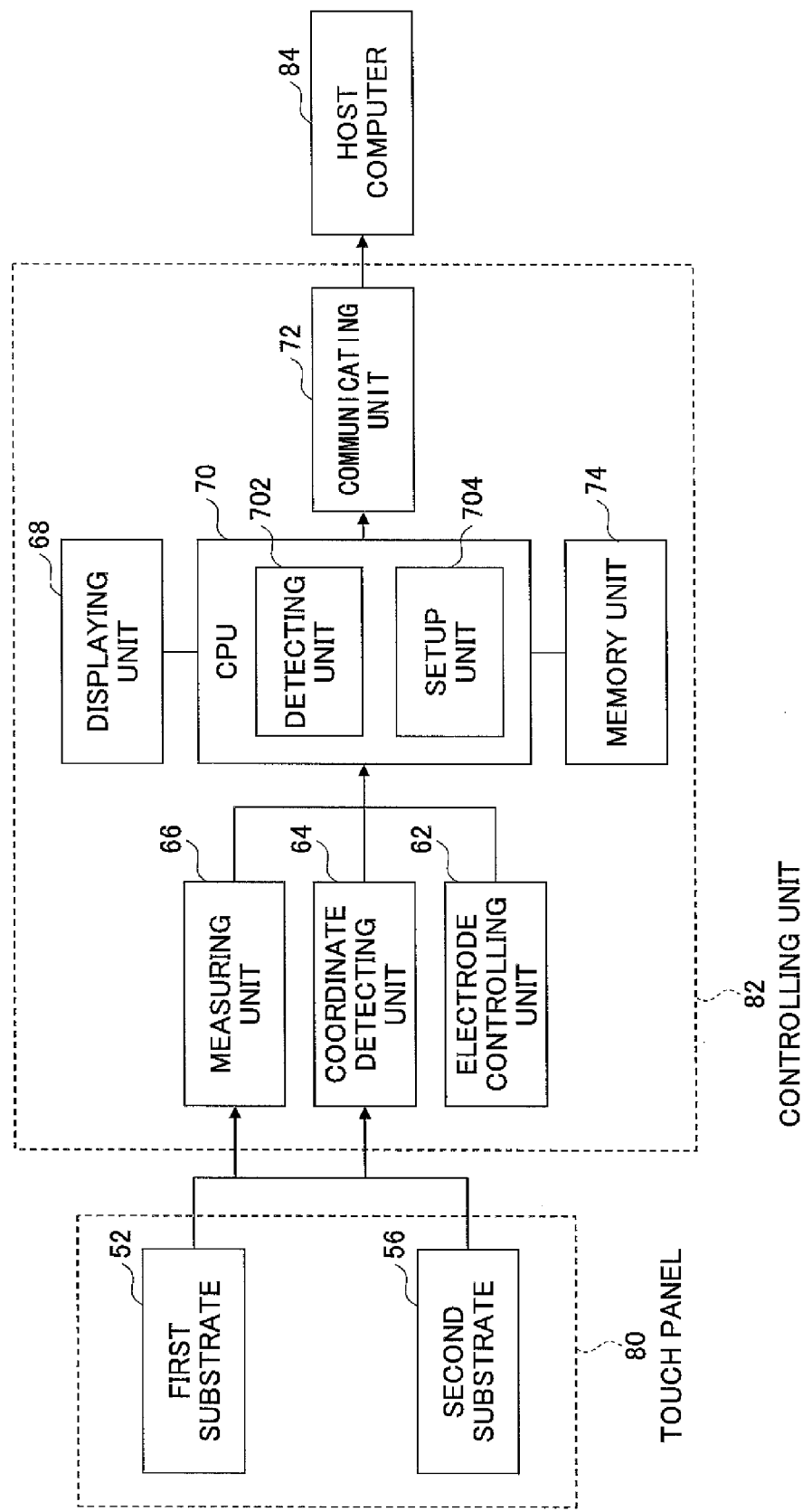
FIG. 3 illustrates a functional structure of a controlling unit of the embodiment.

In the following description, a five wire analog resistive touch panel is applied to an input apparatus of the First Embodiment. However, any resistive touch panel may be applicable to the First Embodiment. FIG. 1 is an exploded perspective view of a touch panel 80 of the First Embodiment. FIG. 2 is a cross-sectional view of the touch panel 80. Referring to FIG. 3, a block chart of the input apparatus of the First Embodiment is illustrated.

Referring to FIG. 3, the input apparatus of the First Embodiment can be broadly classified into a touch panel 80 and a controlling unit 82. The touch panel 80 includes a first substrate 52 and a second substrate 56. The controlling unit 82 includes a measuring unit 66, a coordinate detecting unit 64, an electrode controlling unit 62, an electrode controlling unit 62, a CPU 70, a displaying unit 68, a communicating unit 72 and a memory unit.

Referring to FIG. 1 and FIG. 2, the first substrate 52 and the second substrate 56 are arranged so as to face each other. On four sides of the second substrate 56, a first electrode 111, a second electrode 112, a third electrode 113 and a fourth electrode 114 are arranged. The first electrode 111 and the second electrode 112 are arranged so as to face each other, and the third electrode 113 and the fourth electrode 114 are arranged so as to face each other.

Referring to FIG. 2, resistance films are respectively formed on surfaces of the first substrate 52 and the second substrate 56 which are facing each other. A first resistance film 50 is formed on a resistance film forming surface of the first substrate 52. A second resistance film 54 is formed on a resistance film forming surface of the second substrate 56. The materials of the first resistance film 50 and the second resistance film 54 are, for example, indium tin oxide (ITO).

The surface opposite to the resistance film forming surface of the first substrate 52 functions as operating part 58 to be pressed by a user. The user presses the operating part for an operation. This action of pressing may also be expressed as "touching". Referring to FIG. 2, plural dot spacers 60 are provided between the first substrate 52 and the second substrate 56. If the operating part 58 is not pressed by the user, the first resistance film 50 is placed so as not to touch the second resistance film 54.

[Coordinate Detecting Mode]

Referring to FIG. 2(B), a method of detecting the coordinate of a position G on the operating unit pressed by the user is described. Hereinafter, a mode of detecting the coordinate of the pressed position G is referred to as a coordinate detecting mode. If the user presses the operating part 58, the first substrate 52 is warped, and the first resistance film 50 contacts the second resistance film 54. Then the coordinate detecting unit 64 (see FIG. 3) detects the position where the first resistance film 50 contacts the second resistance film 54 (pressed position) G (see FIG. 1). In the above description, the X-coordinate of the contact position G is referred to as Px1 and the Y-coordinate of the contact position G is referred to as Py1.

Figure 4:
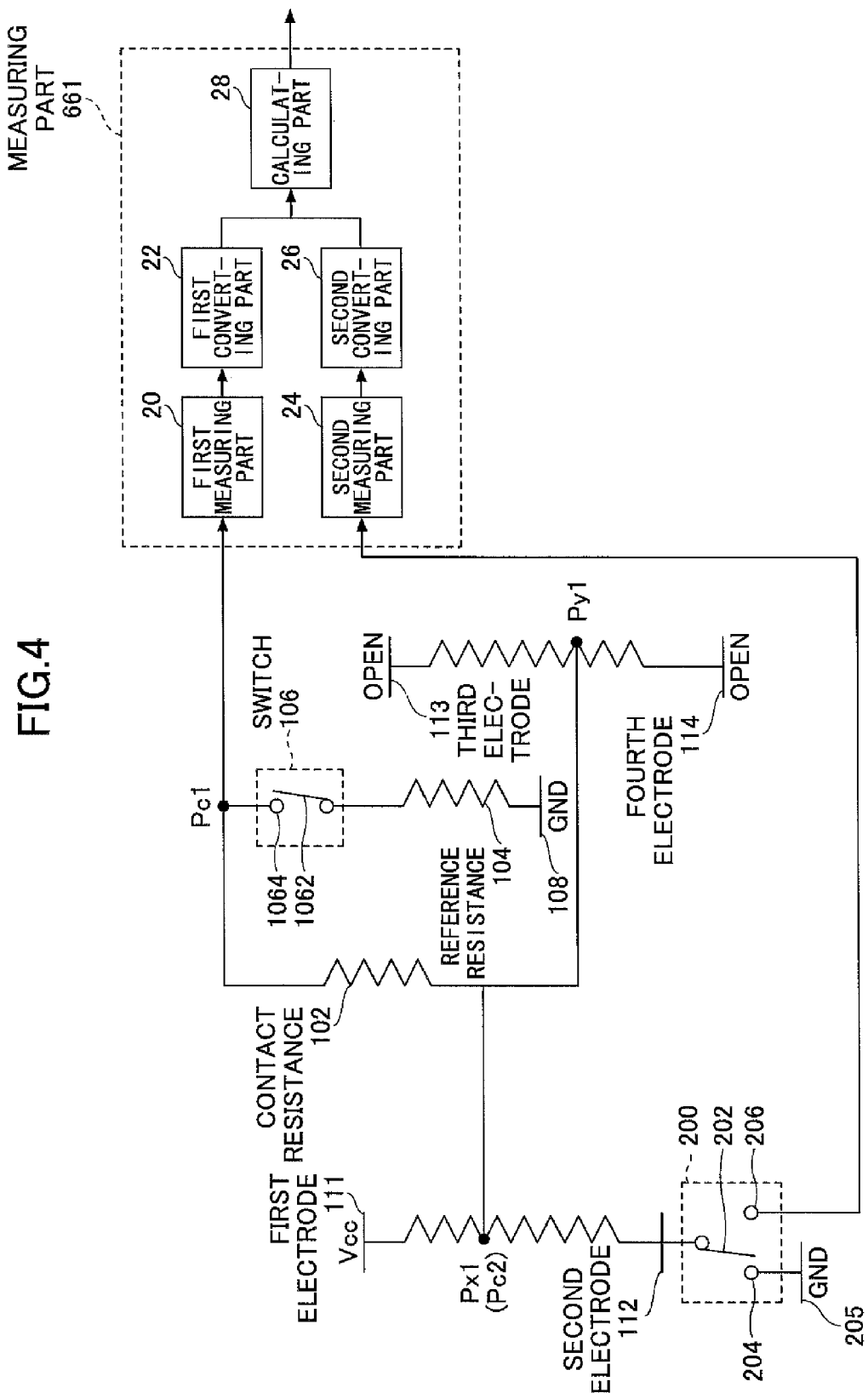
FIG. 4 illustrates a first exemplary functional structure of an important portion in the embodiment.
Figure 5:
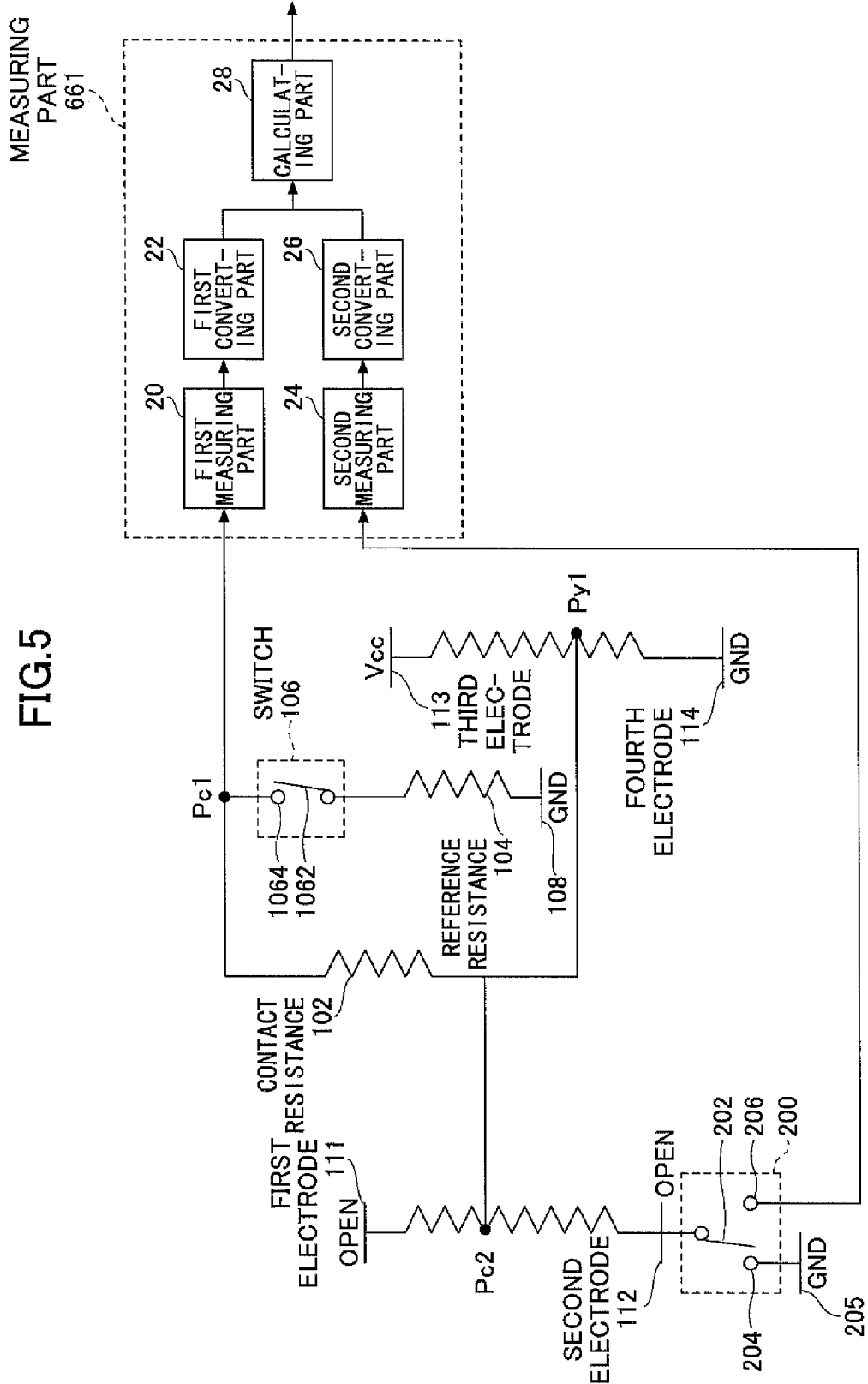
FIG. 5 illustrates a second exemplary functional structure of an important portion in the embodiment.

FIG. 4 and FIG. 5 are block charts of important portions of the input apparatus of the First Embodiment. Referring to FIG. 4 and FIG. 5, a method of detecting a coordinate with the coordinate detecting unit 64 is briefly described. When the X-coordinate is detected, the electrode controlling unit 62 applies voltage to the first electrode 111 to thereby generate a difference in the electric potential in X-axis directions. Referring to FIG. 4, electric potential of the first electrode 111 is Vcc, and electric potential of the second electrode 112 is ground potential Vcc. In this case, the third electrode 113 and the fourth electrode 114 are opened without being applied with voltage. Then, the difference in the electric potential occurs between the first electrode 111 and the second electrode 112. After the coordinate detecting unit 64 detects the electric potential Vx1 of the contact position G (Px1) in the X-axis directions, the X-coordinate (Px1) can be detected.

Provided that a resistance value between the first electrode 111 and the second electrode 112 is designated as Rx, and a resistance value between the contact position Px1 and the second electrode 112 (the ground) is designated as Rx1, Vx1 is represented by the following formula:

$$Vx1=(Vcc/Rx)\cdot Rx1$$

When the Y-coordinate (Py1) is detected, the electrode controlling unit 62 applies a voltage to the third electrode 113 to thereby generate a difference in an electric potential in Y-axis directions. Referring to FIG. 5, the electric potential of the third electrode 113 is designated as Vcc and the electric potential of the fourth electrode 114 is designated as a ground potential (GND). In this case, the first electrode 111 and the second electrode 112 are opened by a switching part 200. Then, a difference in an electric potential occurs between the third electrode 113 and the fourth electrode 114 in parallel with the Y-axis. The coordinate detecting unit 64 detects the Y coordinate (Py1) by detecting the electric potential in the Y-axis directions of the contact position G.

Provided that a resistance value between the third electrode 113 and the fourth electrode 114 is designated as Ry, and a resistance value between the contact position Py1 and the fourth electrode 114 (the ground) is designated as Ry1, Vy1 is represented by the following formula:

$$Vy1=(Vcc/Ry)\cdot Ry1$$

With this, the coordinate detecting unit 64 detects the X coordinate and the Y coordinate of the contact position G and send these to the CPU 70. The CPU 70 sends the X coordinate and the Y coordinate to the host computer 84 via the communicating unit 72. The host computer 84 carries out processes corresponding to the sent X coordinate and the Y coordinate.

[Pressure Information]

Next, a structure of obtaining the pressure information of the input apparatus of the First Embodiment is described. The pressure information of the First Embodiment indicates a pressure load applied by the user to the operating part 58. For example, it is possible to render the pressure information to be (i) information indicative of whether the pressure load is great or small. Further, it is possible to render the pressure information to be (ii) information indicative of a value of the pressure load.

In the following description, erroneously pressing the operating part 58 is refereed to as "erroneous press". The erroneous press may also be referred to as "touching a wrong place". A "correct press" is carried out when the operating part 58 is voluntarily pressed by the user. If the pressure information indicates whether the pressure load is "great" or "small", the input apparatus of the First Embodiment can determine whether the press by the user is "the erroneous press" or "the correct press".

The user may draw characters, marks, drawings or the like on the operating part 58. In this case, if the pressure load applied by the user is "great", the input apparatus of the First Embodiment determines that a writing pressure of the user is great and a line reproduced and depicted on the displaying unit 68 is made thicker. If the pressure load applied by the user is "small", the input apparatus of the First Embodiment determines that the writing pressure of the user is small and a line reproduced and depicted on the displaying unit 68 is made thin.

If the pressure information is (ii) the information indicative of the value of the pressure load, the host computer 70 carries out the process corresponding to the value of the pressure load. Then, the input apparatus becomes easy to be used.

Figure 6:
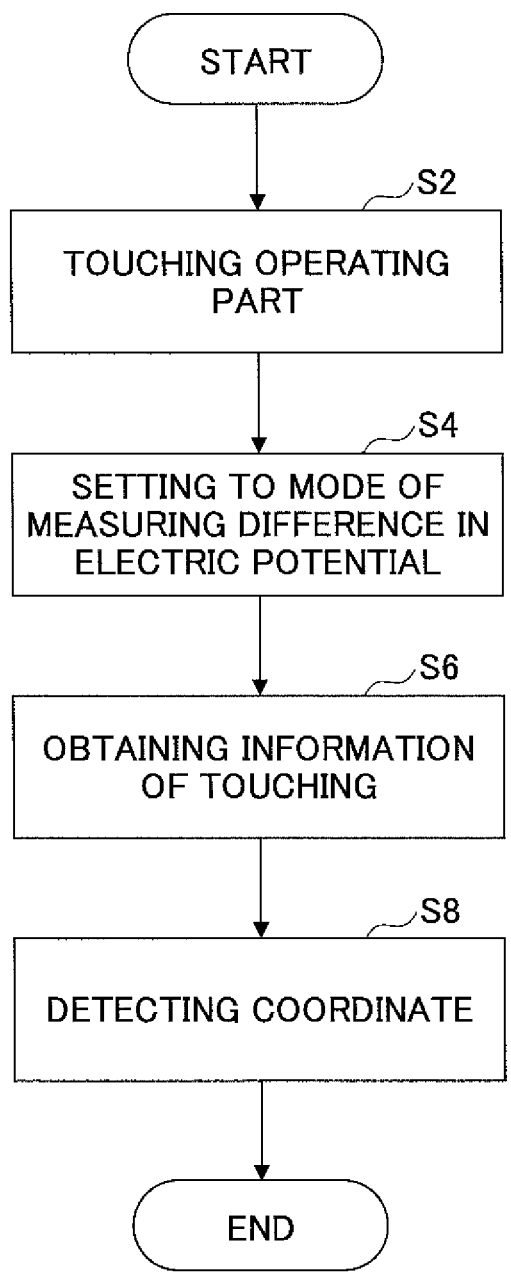
FIG. 6 is a process flow of an input device of the embodiment.

In the following description, the pressure information is the information indicative of whether the pressure load is "great" or "small" and the "correct press" or the "erroneous press" is determined. Referring to FIG. 4, the structure of obtaining the pressure information is described. Referring to FIG. 6, a process flow of the input apparatus of the First Embodiment is described. Referring to FIG. 4, the measuring part 661 of the First Embodiment includes a first measuring part 20, a first converting part 22, a second measuring part 24, a second converting part 26, and a calculating part 28.

Referring to FIG. 6, the user presses the operating part 58 in step S2. At this time, it is not known whether the press is a correct press or an erroneous press. As illustrated in FIG. 2B, the first resistance film 50 contacts the second resistance film 54. The CPU 70 recognizes the contact to thereby recognize the press of the operating part 58 with the user.

Referring to FIG. 4, when the first resistance film 50 contacts the second resistance film 54, the contact resistance 102 is determined. With the Ohm's law, the difference Vm in electric potential between both ends Pc1 and Pc2 of the contact resistance 102 and the contact resistance value Rc of the contact resistance 102 are in proportion (Vm∝Rc). The contact resistance value Rc is inversely proportional to a contact area S (see (B) of FIG. 2) between the first resistance film 50 and the second resistance film 54 (Rc∝ (1/s)). The pressure load F applied by the user is proportional to the contact area S (F∝S). Therefore, referring to FIG. 7, the pressure load F can be summarized to be inversely proportional to the difference Vm in electric potential (Vm∝(1/F)). The input apparatus is operated under a concept A that "the pressure load F is inversely proportional to the difference Vm in the electric potential.

If the CPU 70 recognizes that the first resistance film 50 contacts the second resistance film 54, a mode of measuring a difference in electric potential is set up. There are various methods of setting a mode of measuring the difference in the electric potential. Referring to FIG. 4, the mode of measuring the difference in the electric potential is selected by switching over the switch 106. In the mode of measuring the difference in the electric potential, an electric potential (a first electric potential) of one end Pc1 of the contact resistance 102 and an electric potential (a second electric potential) of the other end Pc2 and the difference Vm in the electric potential are measured.

Referring to FIG. 4, the switch 106 is an ordinary switch. Said differently, when the switch 106 is turned on, a movable end 1062 contacts a fixed end 1064, and the mode changes to a mode of measuring the difference in the electric potential. Meanwhile, when the switch 106 is turned off, the electric contact between the movable end 1062 and the fixed end 1064 is released, the mode of measuring the difference in the electric potential is switched to the coordinate detecting mode described above.

When the switch 106 is turned on, an electric current from a power source Vcc to which the first electrode 111 is connected flows via Pc2, the contact resistance 102, Pc1, the switch 106 which has been turned on, and the reference resistance 104 to the GND 108, in this order. As described, the reference resistance 104 is provided to lead the electric current from the power source Vcc to the GND 108.

When the switch 106 is turned on, the first measuring part 20 measures an analog value (hereinafter, "a first analog value V1") of a first electric potential V1 of the one end Pct of the contact resistance 102. The second measuring part 24 measures an analog value (hereinafter, "a second analog value V2") of a second electric potential V2 of the other end Pc2 of the contact resistance 102.

The first analog value V1 and the second analog value V2 can be represented as follows.

$$V1=(Vcc/(Rx2+Rc+Rd))\times Rd$$

$$V2=(Vcc/(Rx2+Rc+Rd))\times(Rc+Rd)$$

The Rx2 is a resistance value between the first electrode 111 and the Pc2. The Rc is a resistance value of the contact resistance 102, and the Rd is a resistance value of the reference resistance 104.

In order to make certainly measure the second electric potential V2 with the second measuring part 24, the second electrode 112 may contact the switching part 200. The switching part 200 includes a movable end 202, a first fixed end 204 and a second fixed end 206. The first fixed end is connected to a GND (grounded), and the second fixed end 206 is connected to the second measuring part 24. When the CPU 70 switches the mode to the mode of measuring the difference in electric potential, the movable end 202 is electrically connected to the first fixed end 204 or the second fixed end 206 with a short time interval. By changing over the switching part 200, the second measuring part 24 can certainly measure an analog value of the second electric potential V2.

The analog value V1 of the first electric potential measured by the first measuring part 20 is input into the first converting part 22. The second analog value V2 of the second electric potential measured by the second measuring part 24 is input into the second converting part 26.

The first converting part 22 converts the first analog value V1 of the first electric potential to a digital value (hereinafter, referred to as "a first digital value V1'"). The second converting part 26 converts the second analog value V2 of the second electric potential to a digital value (hereinafter, referred to as "a second digital value V2'"). The first converting part 22 and the second converting part 26 may be known A/D converter.

The first digital value V1' from the first converting part and the second digital value V2' from the second converting part 26 may be input into the calculating part 28. The calculating part 28 obtains a difference between the first digital value V1' and the second digital value V2' and outputs the difference as the difference in the electric potential (hereinafter, referred to as "a digital value difference Vm'"). The digital value difference Vm'" is obtainable by the following formula:

$$Vm'=|V1'-V2'|$$

The difference Vm' in the electric potential output from the calculating part 28 is input in the detecting unit 702 of the CPU 70.

The detecting unit 702 obtains the pressure information (the information indicative of whether the pressure load is "great" or "small") based on the measured difference Vm' in the electric potential. In a case where the user carries out a correct press of the operating part (the press voluntarily carried out by the user), the pressure load caused by the press becomes great to a certain extent. On the contrary thereto, if the user erroneously presses the operating part 58 (the erroneous press involuntarily carried out by the user), the pressure load become small to a certain extent. Because of the above concept that the pressure load F is inversely proportional to the difference Vm in the electric potential (referring to FIG. 7), the pressure load F is determined to be small, and the detecting unit 702 determines that the press by the user is the an erroneous press. On the contrary thereto, if the difference in electric potential Vm' is smaller than the threshold value $\alpha$, the pressure load is determined to be great. Then, the detecting unit 702 determines that the press by the user is a correct press.

If the detecting unit 702 determines that the press by the user is the erroneous press, information such as "erroneously touched" may be displayed on the displaying unit 68. By displaying as described above, the user can recognize the erroneous touch.

Further, if the user erroneously presses the touch panel 80, the coordinate detecting unit 64 detects the coordinate of the erroneously pressed position and the host computer 84 performs a process corresponding to the coordinate. Thus, the process is involuntarily carried out. Therefore, if the detecting unit 702 determines that the press by the user is the erroneous press, the coordinate detecting unit 64 (CPU 70) may not send the coordinate of the erroneously pressed position to the host computer 84. With this, even if the user erroneously presses, the erroneous process may be prevented from being carried out.

When the detecting unit 702 determines that the pressure load is "great", the thickness of the line depicted by the user on the operating part 58 is displayed so that the thickness of the line depicted on the operating part 58 becomes thick. When the detecting unit 702 determines that the pressure load is "small", the thickness of the line depicted by the user on the operating part 58 is displayed so that the thickness of the line depicted on the operating part 58 becomes thin.

[Other Pressure Information]

Next, the other pressure information is described. As described above, the pressure information indicates whether the press on the operating part 58 is the erroneous press. Other pressure information may indicate the value of the pressure load F having a unit of N or the like. For example, when the user presses the operating part 58, it is possible to obtain the value of the pressure load F. Two ways of obtaining the pressure load are described.

[First Way]

The first way of obtaining the pressure load F is described. As described above, the pressure load F can be summarized to be inversely proportional to the difference Vm in the electric potential. Said differently, a relationship between the pressure load F and the difference Vm in the electric potential are as follows:

Formula 1

$$F=\beta/Vm \qquad (1)$$

where $\beta$ is a constant experimentally determined in advance. Therefore, if the difference Vm in the electric potential is input in the detecting unit 702 by the measuring unit 66, the detecting unit 702 substitutes the difference Vm in the electric potential for Vm in Formula 1 to thereby obtain the pressure load F. Formula 1 may be memorized in the memory unit 74 in advance.

[Second Way]

The second way of obtaining the pressure load F is described. As described above, the pressure load F can be summarized to be inversely proportional to the difference Vm in the electric potential. Then, a table illustrated in FIG. 8 may be prepared to associate the difference Vm in the electric potential and the pressure load F. Referring to FIG. 8, if the difference in the electric potential is $Vm_1$ the pressure load is $F_1$, and if the difference in electric potential is $Vm_n$, the pressure load is $F_n$.

When the difference in the electric potential Vm is input in the detecting unit 702, the detecting unit 702 refers to the table and obtains the input difference Vm in the electric potential and the corresponding to the pressure load F and outputs these. When the value of the difference Vm in the electric potential input in the detecting unit 702 is the value of the difference in the electric potential which does not exist in the table, a pressure load corresponding to the value of the difference in the electric potential is obtained and output.

The ways of obtaining the pressure load are not limited to the "first way" and "second way" and may be any other way.

The input apparatus of the First Embodiment obtains the difference in the electric potential between the both ends of the contact resistance 102 corresponding to the contact area between the first resistance film 50 and the second resistance film 54. Therefore, the production cost can be reduced and the input apparatus can be made compact.

[b] Second Embodiment

Figure 9:
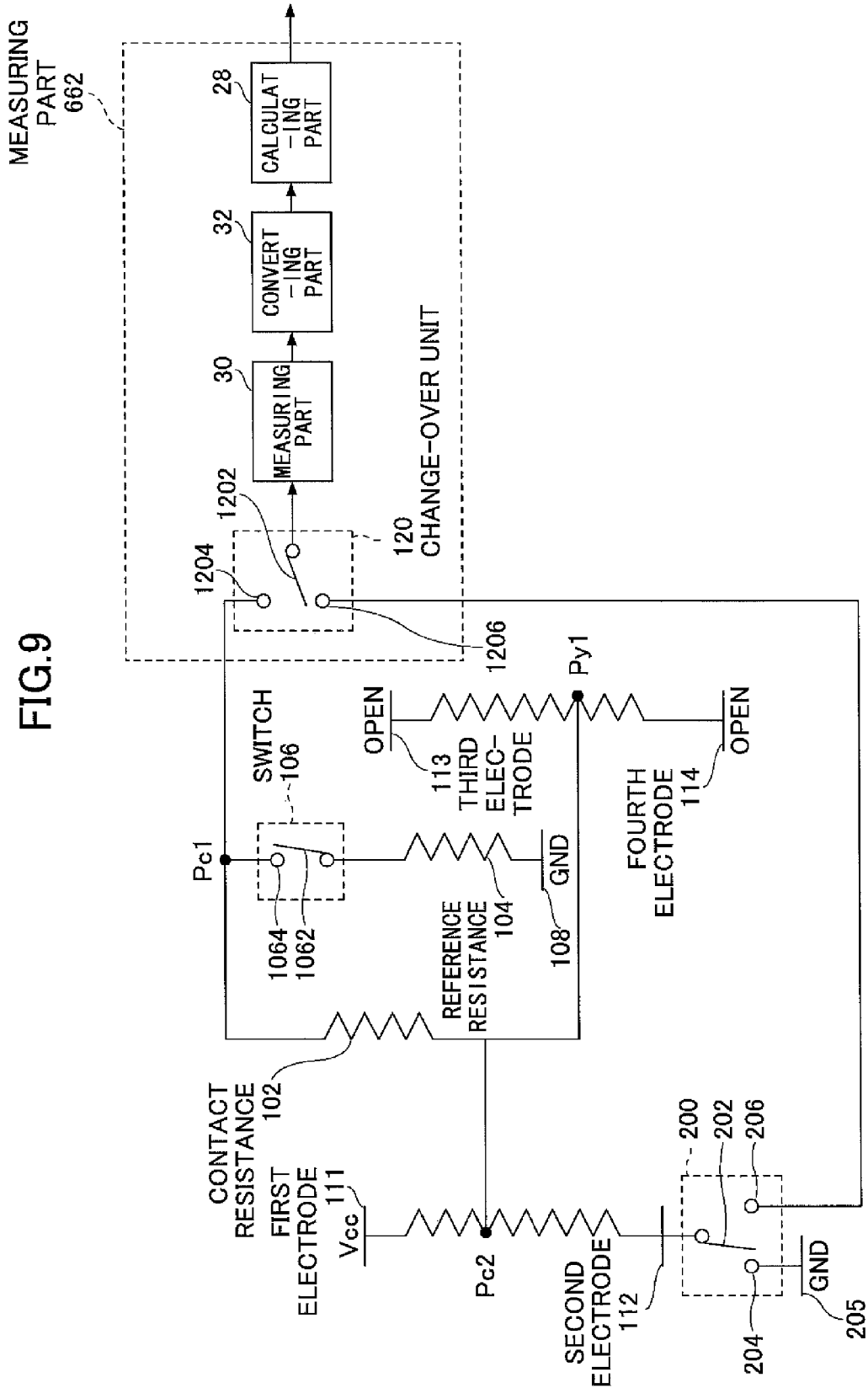
FIG. 9 illustrates a first exemplary functional structure of an important portion in another embodiment.

An input apparatus of the Second Embodiment is described next. Referring to FIG. 9, a block chart of the input apparatus of the Second Embodiment is illustrated. The input apparatus of the Second Embodiment differs from the input apparatus of the First Embodiment at a point that the measuring part 661 of the input apparatus of the First Embodiment is substituted by a measuring part 662. The measuring part 662 includes a change-over unit 120, a measuring part 30, a converting part 32 and a calculating part 28.

The measuring part 30 measures a first analog value V1 of a first electric potential and a second analog value V2 of a second electric potential. The converting part 32 converts the first analog value V1 to the first digital value V1'and also converts the second analog value V2 to the second digital value V2'. The change-over unit 120 includes a movable end 1202, a first fixed end 1204 and a second fixed end 1206. If the movable end 1202 electrically contacts the first fixed end 1204, the measuring part 30 can measure the first analog value V1 of the first electric potential. If the movable end 1202 electrically contacts the second fixed end 1206, the measuring part 30 can measure the first analog value V2 of the second electric potential.

If the operating part 58 is operated and the first resistance film 50 contacts the second resistance film 54, the CPU 70 turns on the switch 106 to change over the mode to the mode of measuring the difference in the electric potential. At the same time, the CPU 70 electrically connects the movable end 1202 of the change-over unit 120 alternately to the first fixed end 1204 or the second fixed end 1206 at short time intervals. Therefore, the measuring part 30 may measure the first analog value V1 of the first electric potential and the second analog value V2 of the second electric potential at short time intervals.

The measured first analog value V1 and the second analog value V2 are input in the converting part 32. The converting part 32 converts the first analog value V1 to the first digital value V1' and also converts the second analog value V2 to the second digital value V2'.

The converted first digital value V1'and the converted second digital value V2' are input in the calculating part 28. The calculating part 28 calculates |V1'-V2'| to obtain the difference Vm' in the electric potential (the digital value difference) and outputs the difference Vm' in the electric potential.

With the input apparatus of the Second Embodiment, the number of the measuring parts and the number of the converting parts may be respectively one. Therefore, the size of the input apparatus can further be made compact.

The calculating parts 28 of the measuring parts 661 and 662 of the First and Second Embodiments may be provided in the CPU 70.

[c] Third Embodiment

Figure 10:
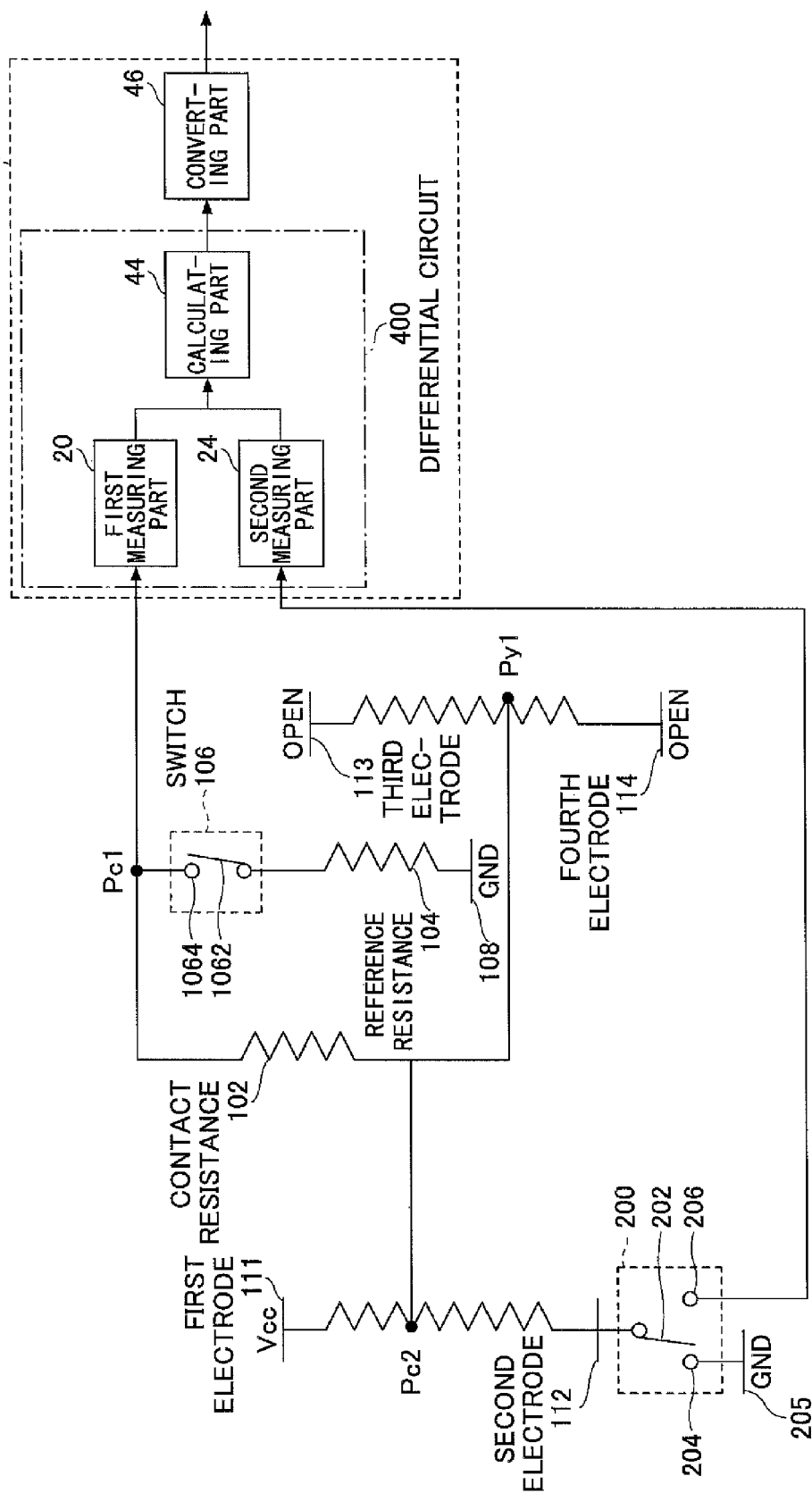
FIG. 10 illustrates a second exemplary functional structure of an important portion in the other embodiment.

An input apparatus of the Third Embodiment is described next. Referring to FIG. 10, a block chart of the input apparatus of the Third Embodiment is illustrated. The input apparatus of the Third Embodiment differs from the input apparatus of the First Embodiment at a point that the measuring part 661 of the input apparatus of the First Embodiment is substituted by a measuring part 663. The measuring part 663 includes a differential circuit 400 and a converting part 46. The differential circuit 400 includes a first measuring part 20, a second measuring part 24 and a calculating part 44.

When the CPU 70 changes the mode to the mode of measuring the difference in the electric potential mode, the first measuring part 20 measures the first analog value V1 of the first electric potential. The second measuring part 24 measures the second analog value V2 of the second electric potential. The calculating part 44 calculates an analog value difference Vm by calculating |V1−V2|. The calculated analog value Vm is input into the converting part 46.

The converting part 46 converts the input analog difference Vm to the digital value difference Vm' and outputs the converted input analog difference Vm to a digital value difference Vm' and outputs the converted digital value difference Vm' as the difference in the electric potential.

With the Third Embodiment, the number of the converting parts can be made one. Therefore, the size of the input apparatus can be made compact.

[Mode of Setting a Threshold Value α]

If the pressure information indicates whether the pressure load applied by the user is great or small, the detecting unit 702 uses the threshold value α to determine whether the press is great or small. The values of the loads of the correct presses are differently applied by the users. Therefore, it is necessary to setup the threshold values α for the users respectively. Therefore, the mode of setting the threshold value α is described.

Figure 11:
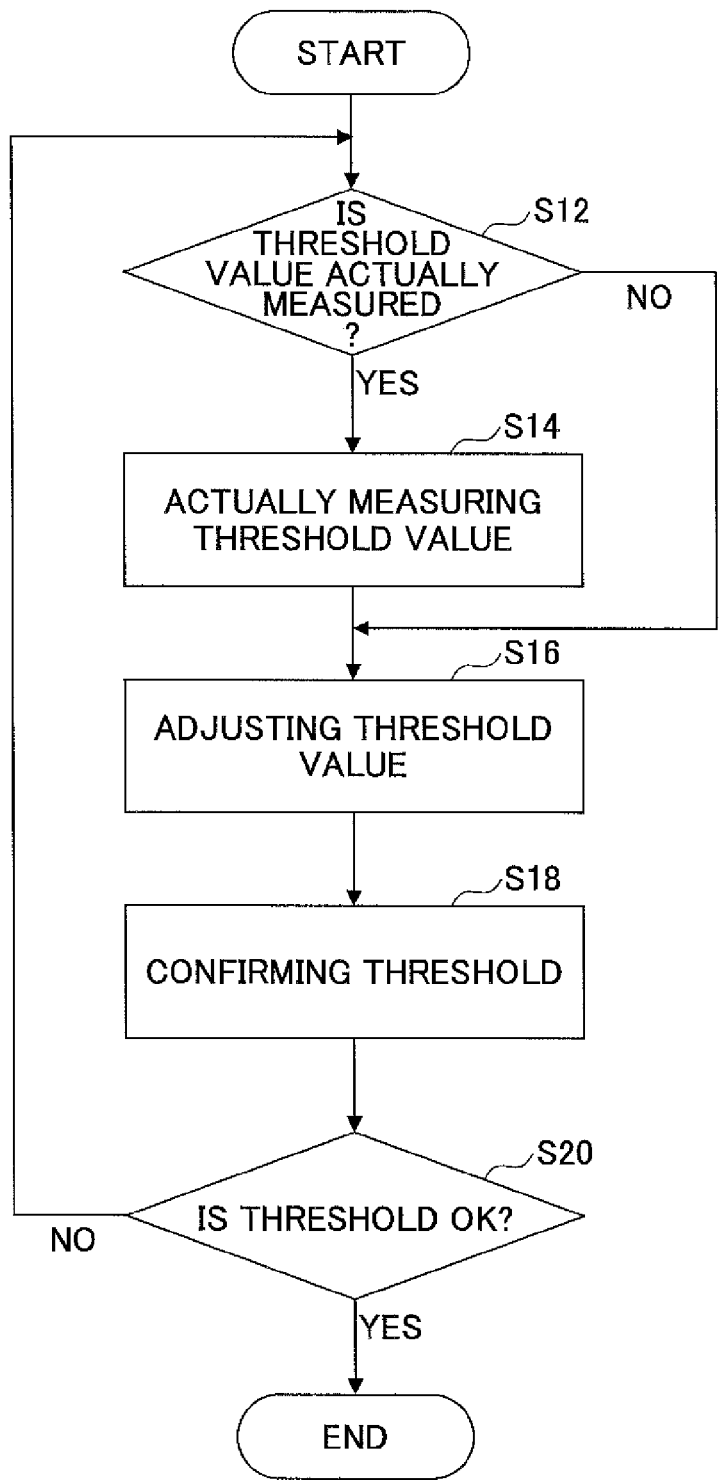
FIG. 11 is a process flow of changing a threshold value.

FIG. 11 illustrates a flow of setting the threshold value α. The CPU 20 makes the display unit (see FIG. 3) display information P prompting selection whether the threshold value α is actually measured. The information P is, for example, a message such as "Do you actually measure the threshold value α?" When the user observes the information P, the user selects whether the threshold value α is actually measured in order to newly determine the threshold value α. In a case where a threshold value α for a user X is not set or the threshold value α for the user X is requested to be changed, the user X selects the actual measurement in Yes of step S12 of FIG. 11.

Meanwhile, if the threshold value α is set for the user X and it is determined that the threshold value α need not to be changed, the user may select that the actual measurement is not carried out by selecting No in step S12.

When Yes is selected in step S12, the process goes to step S14. In step S14, the threshold value α is actually measured. Detailed way for actually measuring the threshold value α is described in detail later.

When the actually measuring process of the threshold value α (the process of step S14) ends or the threshold value is not actually measured in step S12, the process goes to step S16. In step S16, the threshold value α is actually adjusted. The CPU 70 makes the displaying unit 68 display the threshold value α actually measured in step S14 or a preset threshold value α. Then, the user may finely adjust the displayed threshold value α. For example, if the threshold value α is made slightly greater, the threshold value α is increased when the user pushes down a threshold value increasing button (not illustrated). For example, if the threshold value α is made slightly smaller, the threshold value α is decreased when the user pushes down a threshold value decreasing button (not illustrated).

After completing the threshold value adjusting process in step S16, the process goes to step S18. In step S18, the threshold value α is actually confirmed. The CPU 70 displays information Q of prompting a determination whether the threshold value α is appropriate on the displaying unit 68. For example, the information Q is a message such as "is the adjusted threshold value α is appropriate?". The user may confirm the threshold value α after observing the information Q. Specifically, the user presses the operating part 58 to confirm the threshold value α. The displaying unit 68 displays whether the pressing is the erroneous press based on the threshold value α finely adjusted in step S16. The operating part 58 repeats pressing the operating part 58 and displaying whether it is the erroneous press by plural times to thereby determine whether the finely adjusted threshold value α is appropriate. Specifically, if the erroneous press is not displayed when the user presses the operating part 58 with the correct press or if the erroneous press is displayed when the user presses the operating part 58 with the erroneous press, the finely adjusted threshold value α becomes the appropriate threshold value. Specifically, if the erroneous press is not displayed when the user presses the operating part 58 with the erroneous press or if the erroneous press is displayed when the user presses the operating part 58 with the correct press, the finely adjusted threshold value α is not the appropriate threshold value. After completing the threshold value confirming process, the process goes to step S20.

In step S20, the user determines whether the threshold value α is appropriate. The CPU 70 makes the displaying unit 68 display information R thereby enabling the user to determine whether the threshold value α is appropriate. The information R is a message such as "Is the threshold value α is OK?". If the threshold value α is appropriate in the threshold value confirming process of step S18, the user presses an OK button (not illustrated) and the setup unit 704 (see FIG. 3) sets the threshold value α in Yes of step S20. If the threshold value a is not appropriate in the confirming process of step S18, the user presses a NG button (not illustrated) and goes back to step S12. As described, the threshold value α is determined based on the processing flow of FIG. 11.

Figure 12:
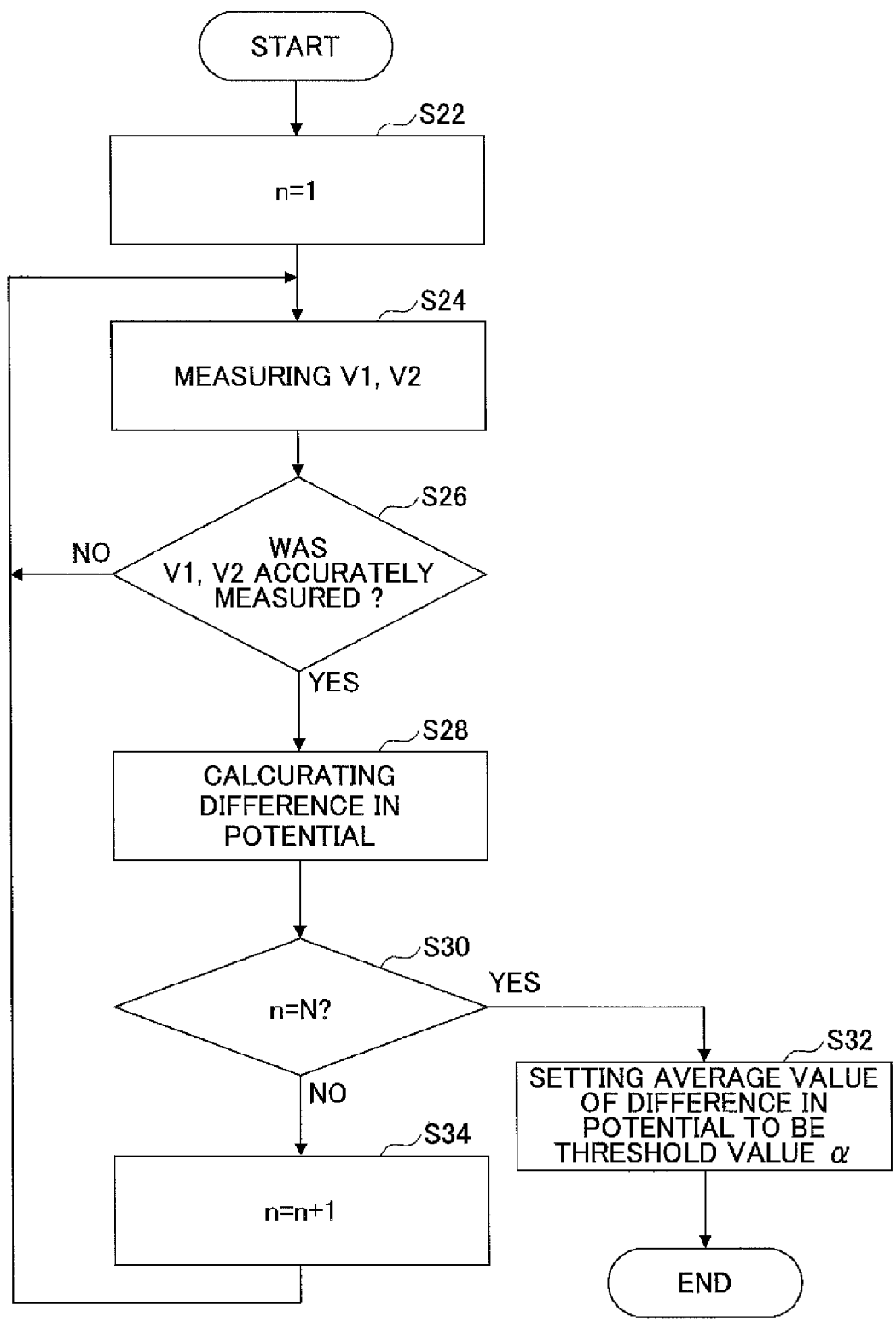
FIG. 12 is a process flow of actually measuring the threshold value.

Next, a detailed process of actually measuring the threshold value α in step S14 is described. In the following description, the process of actually measuring the threshold value α using the input apparatus of the First Embodiment is exemplified. However, the input apparatuses of the Second and Third Embodiments may be used. FIG. 12 illustrates a flow of actually measuring the threshold value α. Briefly explaining, in the actual measurement of the threshold value α, the user presses the operating part 58 with a pressure load of the erroneous press by N times (N is a natural number. Hereinafter, the press of the operating portion 58 for actually measuring the threshold value is specifically called "a provisional press". The differences Vm in the electric potential are obtained by each provisional press and an average value of the differences Vm in the electric potential of the N times is acquired. The acquired average value is set as the threshold value α.

In a case where the actually measuring process is carried out, the CPU 70 causes the display portion 68 to display information S such as "Please press the operating part 58 with a pressure load of the erroneous press" to prompt the user to erroneously press the operating part 58.

Next, a parameter n (n=1 to N) is set to be "1". The parameter n indicates the number of the provisional presses. When n=1, the provisional press is carried out once. In this case, the user provisionally presses the operating part 58. After the provisional press, the first measuring part 20 illustrated in FIG. 4 obtains the first analog value V1 of the first electric potential, and the second measuring part 24 obtains the second analog value V2 of the second electric potential in step S24.

Then, the CPU 70 determines whether the first analog value V1 and the second analog value V2 are accurately measured. For example, the determination is carried out by determining whether V2 is in the GND level (the electric potential of V2 is zero). If V2 is in the GND level, the first analog value V1 and the second analog value V2 are determined not to be accurately measured.

If the first analog value V1 or the second analog value V2 is not accurately measured, the process returns to step S24. If the first analog value V1 and the second analog value V2 are accurately measured, the process goes to step S28.

With step S28, the first converting part 22 and the second converting part 26 convert the first analog value V1 and the second analog value V2 to the first digital value V1' and the second digital value V2', respectively. The calculating part 28 obtains a difference Vm' in the electric potential between the first digital value V1' and the second digital value V2' in step S28. The obtained difference in the electric potential Vm' is stored in the memory unit 74.

The CPU 70 determines whether the number n of the provisional presses reaches N. If the number n reaches N in Yes of step S30, the process goes to step S32. If the number n does not reach N, the number n is incremented in step S34 and the process returns to step S24. The process is repeated to acquire the difference Vm' in the electric potential until the number n reaches N. The obtained difference Vm' in the electric potential is stored in the memory unit 74. When the number n reaches N, the difference Vm' in the electric potential is stored in the memory unit 74.

In step S32, the CPU 70 calculates an average value of the differences Vm' in the electric potentials, the number of which is N. The calculated average value is a threshold value α. The average value may be calculated as an average value of the differences Vm' in the electric potential as many as N. Further, the average value may be obtained from the differences Vm' in the electric potential as many as (N-2) excluding the maximum difference and the minimum difference.

With the process flow illustrated in FIG. 11 and FIG. 12, the threshold value α corresponding to the user may be obtained. As described, the setup unit 704 sets up the threshold value α based on the differences Vm' in the electric potential measured by the measuring part 66 when the operating part 58 is provisionally pressed. Further, if the value of the threshold value α is not appropriate for the user in steps S18 and S20 after the user directly observes the value of the threshold value α, the threshold value α is preferably changeable.

Further, if the users and the threshold values a appropriate for the users are associated and then stored, it is possible to make the threshold values a corresponding to the users use to facilitate usability. FIG. 13 illustrates a table associating the users and the threshold values α. In an example of FIG. 13, the threshold value $α_1$ is used for the user X. The table illustrated in FIG. 13 is stored in the memory unit 74. Before the user presses the operating part 58 of the input apparatus of the Third Embodiment, the user may input his or her name to the input apparatus. Then, the CPU 70 refers to the table illustrated in FIG. 13 and uses the threshold value corresponding to the input name. With the structure, it is possible to accurately carry out the detection of the erroneous press or the like in association with the users.

[Others]

(1) In FIG. 4, FIG. 9 and FIG. 10, the voltage is applied between the first electrode 111 and the second electrode 112, the third electrode 113 and the fourth electrode 114 are opened, and the difference in the electric potential of both ends of the contact resistance 102 is measured. Otherwise, when the voltage is applied between the third electrode 113 and the fourth electrode 114, and the first electrode 111 and the second electrode 112 are opened, the difference in the electric potential of both ends of the contact resistance 102 may be measured.

(2) In FIG. 6, step S8 (the coordinate detecting process) is carried out after step S4 (the mode of measuring the difference in the electric potential) and step S6 (obtaining the pressure information). Otherwise, after step S8, step S4 and step S6 may be carried out.

(3) FIG. 14 is an exploded perspective view of a touch panel to which plural positions can be input. The first substrate 52 is divided into plural areas. The input apparatuses of the embodiments can use this type of the touch panel.

(4) As described above, the input apparatuses of the embodiments use the five wire analog resistive touch panel. However, as long as a resistive film type touch display is used, another method (e.g., a four wire analog resistive touch panel) may be used.

Effect of the Invention

According to the input apparatus and the input method of the present invention, a manufacturing cost can be reduced, compactness of the device can be realized, and pressure information indicative of a pressure load can be obtained.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

What is claimed is:

1. An input apparatus comprising:
   a first substrate in which a first resistance film is provided on its one surface;
   a second substrate in which a second resistance film is provided on its one surface facing the first resistance film;
   a first pair of electrodes provided on the second resistance film so as to face each other, and provided for applying electric potential distribution to the second resistance film in a first direction;
   a second pair of electrodes provided on the second resistance film so as to face each other, and provided for applying the electric potential distribution to the second resistance film in a second direction different from the first direction;
   a reference resistance in which its one end is connectable to the first resistance film and its another end is grounded;
   a measuring unit configured to measure a difference in electric potential for each of the first direction or the second direction while the electric potential is applied to the second resistance film and the reference resistance is connected to the first resistance film, the difference in electric potential being a difference between a first electric potential of a first end of a contact resistance and a second electric potential of a second end of the contact resistance, the contact resistance being generated when the first resistance film and the second resistance film contact each other; and
   a detecting unit configured to obtain pressure information indicative of a pressure load caused when the first substrate is pressed based on the difference in electric potential measured by the measuring unit.

2. The input apparatus according to claim 1, wherein the measuring unit includes
   a first measuring part that measures a first analog value of the first electric potential;
   a second measuring part that measures a second analog value of the second electric potential;
   a first converting part that converts the first analog value to a first digital value;
   a second converting part that converts the second analog value to a second digital value; and
   a calculating part that calculates the difference between the first digital value and the second digital value as the difference in electric potential.

3. The input apparatus according to claim 1, wherein the measuring unit includes
   a measuring part that measures the first analog value of the first electric potential and the second analog value of the second electric potential;
   a converting part that converts a first analog value to a first digital value and a second analog value to a second digital value;
   a change-over unit that changes over an input of the first analog value or an input of the second analog value to the measuring part; and
   a calculating part that calculates the difference between the first digital value and the second digital value as the difference in electric potential.

4. The input apparatus according to claim 1, wherein the measuring unit includes
   a first measuring part that measures a first analog value of the first electric potential;
   a second measuring part that measures a second analog value of the second electric potential;
   a calculating part that calculates an analog difference between the first analog value and the second analog value; and
   a converting part that converts the analog difference to a digital difference as the difference in electric potential.

5. The input apparatus according to claim 1,
wherein the detecting unit detects whether the pressure load is great or small based on a comparison between the measured difference in electric potential and a threshold value.

6. The input apparatus according to claim 5, further comprising:
a coordinate detecting unit that detects a coordinate of a pressed position on the first substrate and outputs the detected coordinate when the detecting unit detects that the pressure load is great.

7. The input apparatus according to claim 1,
wherein the pressure information indicates a value of the pressure load, and the detecting unit calculates a value of the pressure load based on the difference in electric potential.

8. The input apparatus according to claim 5, further comprising:
a setup unit configured to set the threshold value based on the difference in electric potential measured by the measuring part when the operating part is provisionally pressed.

9. The input apparatus according to claim 8,
wherein the threshold value can be changed.

10. An input method carried out by an input apparatus including first substrate to be pressed by a user on which a first resistance film is provided, and a second substrate on which a second resistance film is provided so as to face the first resistance film, the input method comprising:
applying, by a first pair of electrodes provided on the second resistance film so as to face each other, electric potential distribution to the second resistance film in a first direction, and applying, by a second pair of electrodes provided on the second resistance film so as to face each other, the electric potential distribution to the second resistance film in a second direction different from the first direction;
connecting one end of a reference resistance, in which its another end is grounded, to the first resistance film;
measuring a difference in electric potential between a first electric potential of a first end of a contact resistance and a second electric potential of a second end of the contact resistance while the electric potential is applied to the second resistance film and the reference resistance is connected to the first resistance film, the contact resistance being generated when the first resistance film and the second resistance film contact each other; and
obtaining pressure information indicative of a pressure load caused by the pressing of the irst substrate based on the measured difference in electric potential.

11. The input method according to claim 10,
wherein the measuring the difference in electric potential includes
measuring a first analog value of the first electric potential;
measuring a second analog value of the second electric potential;
converting the first analog value to a first digital value;
converting the second analog value to a second digital value; and
calculating the difference between the first digital value and the second digital value as the difference in electric potential.

12. The input method according to claim 10,
wherein the measuring the difference in electric potential includes
measuring a first analog value of the first electric potential and a second analog value of the second electric potential
converting the first analog value to a first digital value and the second analog value to a second digital value;
changing over an input of the first analog value or an input of the second analog value for the measuring the first analog value of the first electric potential and the second analog value of the second electric potential; and
calculating the difference between the first digital value and the second digital value as the difference in electric potential.

13. The input method according to claim 10,
wherein the measuring includes
measuring a first analog value of the first electric potential;
measuring a second analog value of the second electric potential;
calculating an analog difference between the first analog value and the second analog value; and
converting the analog difference to a digital difference as the difference in electric potential.

14. The input method according to claim 10,
wherein detecting detects whether the pressure load is greater or smaller based on a comparison between the measured difference in electric potential and the threshold value.

15. The input method according to claim 14, further comprising:
detecting a coordinate of a pressed position on the first substrate; and
outputting the detected coordinate when it is determined that the pressure load is greater than the threshold value,
wherein if the detecting detects that the pressure load is smaller than the threshold value, the outputting of the coordinate is not carried out.

16. The input method according to claim 10,
wherein the pressure information indicates a value of the pressure load, and the detecting calculates a value of the pressure load based on the difference in electric potential.

17. The input method according to claim 14, further comprising:
setting the threshold value based on the difference in electric potential measured by the measuring if the operating part is provisionally pressed.

* * * * *